(12) United States Patent
Cotner et al.

(10) Patent No.: US 7,269,607 B2
(45) Date of Patent: *Sep. 11, 2007

(54) METHOD AND INFORMATION TECHNOLOGY INFRASTRUCTURE FOR ESTABLISHING A LOG POINT FOR AUTOMATIC RECOVERY OF FEDERATED DATABASES TO A PRIOR POINT IN TIME

(75) Inventors: Curt Cotner, Gilroy, CA (US); Namik Hrle, Boeblingen (DE); James Teng, San Jose, CA (US)

(73) Assignee: International Business Machines Coproartion, Armonk, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/880,267

(22) Filed: Jun. 29, 2004

(65) Prior Publication Data

US 2005/0071384 A1    Mar. 31, 2005

(30) Foreign Application Priority Data

Sep. 29, 2003   (EP)   ................................. 03103602

(51) Int. Cl.
*G06F 12/00*   (2006.01)
*G06F 17/30*   (2006.01)
(52) U.S. Cl. ...................... 707/200; 707/202; 707/204

(58) Field of Classification Search .................... 707/1, 707/8, 200–202, 203–204; 714/2, 15, 16, 714/19
See application file for complete search history.

(56) References Cited

U.S. PATENT DOCUMENTS

| 5,832,515 | A  | * | 11/1998 | Ledain et al. ................ 707/202 |
| 6,684,336 | B1 | * | 1/2004  | Banks et al. ................. 709/227 |
| 6,915,315 | B2 | * | 7/2005  | Autrey et al. ................ 707/204 |
| 6,965,896 | B1 | * | 11/2005 | Shedden ...................... 707/100 |
| 7,047,380 | B2 | * | 5/2006  | Tormasov et al. ........... 711/162 |
| 7,062,516 | B2 | * | 6/2006  | Bhat .......................... 707/202 |
| 7,134,116 | B1 | * | 11/2006 | Thekkath et al. ............ 717/128 |
| 2003/0208511 | A1 | * | 11/2003 | Earl et al. .................... 707/204 |
| 2005/0055605 | A1 | * | 3/2005  | Blumenthal et al. .......... 714/13 |
| 2005/0091557 | A1 | * | 4/2005  | Mitchell et al. ................ 714/2 |

* cited by examiner

*Primary Examiner*—Jeffrey Gaffin
*Assistant Examiner*—Jacques Veillard
(74) *Attorney, Agent, or Firm*—Stephen R. Tkacs; Stephen J. Walder, Jr.; Diana R. Gerhardt

(57) ABSTRACT

According to the method for establishing a log point an information technology infrastructure is provided. Transactions are performed by at least two database units of the information technology infrastructure. Then, "suspending prepare to commit"-requests are sent from said coordinating device to said database units. The log writes of all database units are suspended and recorded, whereas these log points form a global log point. Finally the log writes of all database units and all the suspended transactions are resumed.

17 Claims, 5 Drawing Sheets

METHOD AND INFORMATION TECHNOLOGY INFRASTRUCTURE FOR ESTABLISHING A LOG POINT FOR AUTOMATIC RECOVERY OF FEDERATED DATABASES TO A PRIOR POINT IN TIME

BACKGROUND OF THE INVENTION

1. Field of the Invention

The present invention relates to the field of database management. Particularly, the present invention relates to a method and to an information technology infrastructure for establishing a log point for automatic recovery of federated databases to a prior point in time.

2. Description of the Related Art

A failure, e.g. a media failure in a computer or in a database system often requires a recovery to currency in order to rescue important data. Individual recovery of each affected component can bring the entire system to a consistent state. However, this procedure cannot be used if the system needs to be recovered to any point in time in the past. Namely, there is no common database log for all the participating components of the system.

It is possible to stop/quiesce and update processing for all the components of the system, register that time or the associated recovery log point and use it as a target in subsequent recovery. The recovery target point established in this way is indeed a point at which the intra- and inter-component consistency is guaranteed, but the process of obtaining these points is prohibitively disruptive for normal functioning of the system, complex and error prone in terms of human interaction, and poses a major hurdle in achieving a high level of continuous operations which is an important requirement of the business critical applications.

A conventional method and a system is known for establishing synchronized recovery log points in an infrastructure having at least a first database management system and a second database management system, whereby recovery log files are written and log points are created separately for each database management system. According to this method, log write of all database management systems is suspended, then, the corresponding log points for each database management system forming a global log point are recorded and log writes of all database management systems are resumed. With this method it is inevitable to suspend or to interrupt transactions, which happen to be "in-doubt" at the time of suspending the log writes.

It is a drawback of this method that additional manual intervention is required in order to find out what happened to such "in-doubt"-transactions after the log writes are resumed.

SUMMARY OF THE INVENTION

It is an object of the present invention to provide a secure and fast method that enables automatic recovery of databases to any prior point in time without the need of additional manual intervention. It is a further object of the present invention to provide a reliable information technology infrastructure with which such an automatic recovery of databases can be executed.

The foregoing object is achieved by a method and by an information technology infrastructure as recited in the independent claims. Further advantageous embodiments of the present invention are described in the dependent and are taught in the following description.

According to the present invention a method and an information technology infrastructure is provided for establishing a log point for automatic recovery of federated, i.e. related, databases to a prior point in time.

The information technology infrastructure comprises at least two database units, a network and a coordinating device for coordinated suspending log write of all database units, for recording the log points for each database unit forming a global log point and for resuming log writes of all database units.

Current information technology infrastructures often consist of multiple components running on different hardware and software. As these components exchange data and interact with each other the entire system needs to be considered as a single unit of semantical integrity. In other words the data must be consistent not only within each individual application component, which is called intra-component consistency, but across the system as well, which is called inter-component consistency. Typical examples of such IT infrastructures are e-business applications such as CRM (Customers Relations Management) and SCM (Supply Chain Management) which are built on top of the existing ERP (Enterprise Resource Planning) or legacy applications and are tightly integrated with them.

The database units included in the information technology infrastructure perform a variety of different transactions. These transactions comprise SQL (Structured Query Language)-commands, "single-phase commit"-processes and "two-phase commit"-processes. In a "two-phase commit"-process at least two database units are involved. Such a "two-phase commit"-process comprises the step of sending a "prepare to commit"-request from a first database unit to a second database unit and the further step of performing the "commit"-statement by the second database unit.

According to the invention, the coordinating device sends a "suspending prepare to commit"-request to the database units. These "suspending prepare to commit"-requests can also be called "quiesce "in-doubt"-transactions"-requests.

Having received such a "suspending prepare to commit"-request, the database units enter the "suspending prepare to commit"-state. This "suspending prepare to commit"-state has the following characteristics.

1) Any transaction that is not engaged in a "two-phase commit"-process is allowed to continue.

2) Any transaction that is engaged in a "two-phase commit"-process and for which the "prepare"-request had been initiated before the "suspending prepare to commit"-request is allowed to continue. The transaction that takes the longest time to commit determines the time in which the respective database unit stays in the "suspending prepare to commit"-state.

3) Any transaction that is about to be engaged in a "two-phase commit"-process, i.e. for which the "prepare"-request was initiated after the "suspending prepare to commit"-request is suspended.

The database units stay in the "suspending prepare to commit"-state and wait for the transactions described in 2) to be completed. When all these transactions have been completed, the log writes of all database units are suspended. Thereafter, the log points for each database unit are recorded. The individual log points of all database units form a global log point.

According to the next step of the method, the log writes of all database units are resumed. With this step, the information technology infrastructure exits the "suspending prepare to commit"-state. Finally, all the suspended transactions, described in 3) are resumed. In this document the meaning of the terms "transaction" and "process" is the same.

According to a fundamental idea of the present invention, occurrences of "in-doubt"-transactions after recoveries to prior points in time are eliminated.

With conventional techniques "two-phase commit"-processes were just interrupted when establishing a log point for the recovery of federated database units. Such interrupted "two-phase commit"-processes happened to be "in-doubt"-transactions at the time of suspending log writes. Therefore, these transactions ended up being in-doubt after the recovery to the prior point in time is done. The only way to resolve such an "in-doubt"-transaction is to find out what actually happened with it after the log writes were resumed, i.e. whether all its parts committed, in which case the entire transaction should be rendered committed, or at least one backed-out, in which case typically the entire transaction needs to be backed out.

It is obvious, that such situations with subsequent additional manual interventions which have been necessary in the existing recovery procedures, are reliably avoided when using the method according to the present invention. The method according to the invention introduces a technique to avoid these "resolve in-doubt"-situations and enables an entirely automatic recovery to a prior point in time with minimal impact on continuous system's operations. Moreover, the present invention provides a necessary building block in a solution that implements recovery of federated databases without any manual interventions and removes the need for complex, manual investigation whether "in-doubt"-transactions need to be committed or backed out after a coordinated recovery of related databases.

According to the described method, the target recovery points in time are established by synchronized suspension and resumption of log writes. In order to ensure that there are no "in-doubt"-transactions at the time the log writes are suspended, the transactions that are engaged in "two-phase commit"-process are quiesced. It is advantageous, that this approach is associated with minimal disruption to the normal system operations because the transactions that are executing SQL or being engaged in "single-phase commit"-processes are not disrupted in any way and the quiesce affects only those distributed transactions that are involved in the "two-phase commit"-process right at the time when the "log write suspend"-process is initiated.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
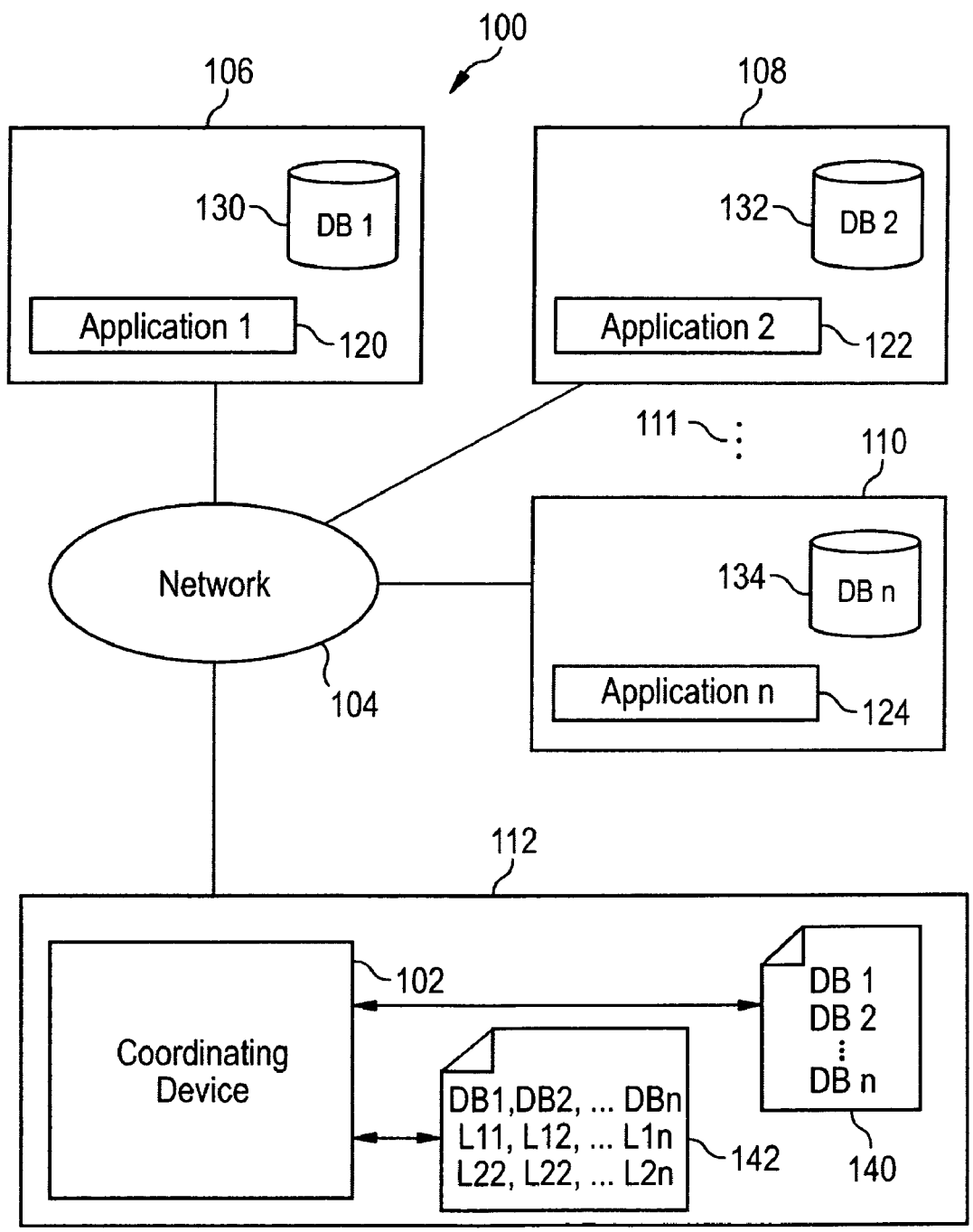
FIG. 1 shows a block diagram illustrating a information technology infrastructure in which a method for establishing a log point for automatic recovery of federated databases to a prior point in time may be used.

According to a first advantageous embodiment, the coordinating device sends out continuing "prepare to commit"-requests to said database units as well as an error message, if the waiting time exceeds a specified time threshold, which is a user defined parameter. In other words, the whole process of quiescing is aborted and all the transactions continue processing, if the waiting time is too long. The transaction that caused the process to fail is reported by the coordinating device for further diagnostics. With this advantageous embodiment undesired waiting times can be avoided.

According to a second advantageous embodiment, the log writes of all database units are suspended, when a "commit start"-log record is written for the last "two-phase commit"-process being in process. A "two-phase commit"-process goes from the "in-doubt"-state into the "committed"-state, as soon as the "commit start" log record is written. With this additional step it is ensured, that not a single "in-doubt"-transaction can occur.

With the initial step of retrieving or generating a list of all database units contained in the information technology infrastructure by the coordinating device, it is secured that all components of the IT-infrastructure are considered.

The method can be executed advantageously, when at least one of said database units comprises an application unit and a database. Each of these databases can contain both a database management system and a storage device.

In order to ensure inter- and intra-component consistency current applications most often rely on two well known technologies. The intra-component consistency is achieved by deploying a DBMS (database management system) which includes necessary mechanisms such as maintaining recovery log and concurrency control. The inter-component consistency is typically maintained by using the "two-phase commit"-protocol of the database management system. Such database management systems and "two-phase commit"-protocols are known to a person skilled in the art.

According to a further embodiment, each of the database units can be provided on a separate computer system, whereas the computer systems are interconnected by the described network. Therefore, the applicability of the present invention is extensive.

When the provided information technology infrastructure also includes a timer, the flow of the steps of the method can suitably controlled. Such a timer can be activated before the sending of "suspending prepare to commit"-requests. The resuming of the log writes of all database units can be triggered by a wake-up event, which is generated by the timer. Such a wake-up event can e.g. be generated by the timer, if all database units have suspended their log writes. Before sending such an additional wake-up event, a waiting or resting step can be carried out.

When the step of sending "suspending prepare to commit"-requests is encapsulated into the step of suspending log writes of all database units, i.e. when the quiesce process is performed implicitly as a part of the suspending log write process, the resumption of log writes coincides with resuming suspended "in-doubt"-transactions.

Having established a global log point, the method can continue with the step of selecting a global log point by said coordinating device and with the further step of initiating to recover each database management system to their log points associated to said selected global log point by said coordinating device. With this embodiment, automated recovery of the databases is provided.

The invention also relates to an information technology infrastructure. According to the invention, the coordinating device of the information technology infrastructure is intended for coordinated suspending log write of all database units, for recording the log points for each database unit forming a global log point and for resuming log writes of all database units.

In a first embodiment of the information technology infrastructure, the database units of the information technology infrastructure comprise an application unit and a database each. Each of these databases can contain a database management system and a storage device, as described above.

Each of said database units can be provided on a separate computer system, whereby a huge applicability of the invention is provided. To ensure reliable functionality of the information technology infrastructure, these computer systems need only to be interconnected by said network.

The invention is also verified by a computer program for carrying out a method for establishing a log point for automatic recovery of federated databases to a prior point in time, the computer program comprising program instructions for causing an information technology infrastructure or at least one database unit and a coordinating device of an information technology infrastructure to perform this method.

The log points are set and stored automatically and subsequently for the database units involved by the computer program. The recovery of the database units involved to the prior points in time which are defined by said log points can also be automated.

By using such a computer program a reliable recovery of databases is ensured, providing an improved data integrity. The inventory method can be set up in any information technology infrastructure easily and fast.

The invention also relates to a computer program embodied on a recording medium, to a computer program stored in a computer memory or embodied in a read-only memory and to a computer program carried on an electrical carrier signal. Furthermore, the invention relates to a carrier, especially to a data carrier, having thereon such a computer program as well as to a computer system having such a computer program stored therein. Finally, the invention relates to a method comprising the step of downloading such a computer program from an electronic data network, especially from the Internet, to a computer system, which is interconnected to said electronic data network.

With reference to FIG. 1, there is depicted a block diagram illustrating an information technology infrastructure 100 in which a method for establishing a log point for automatic recovery of federated databases to a prior point in time according to the present invention may be used. Such an IT infrastructure 100 can be implemented in many business applications systems. The IT infrastructure 100 includes a network 104 and a plurality of database units, illustrated as a first database unit 106, as a second database unit 108 and as a n-th database unit 110, whereby the dots 111 indicate further database units. Namely, the number n of database units forming the IT infrastructure 100 is not limited to three. It may, in fact, be much higher. Today, it is typically 3-5, sometimes up to 10. Furthermore, a computer system 112 providing a platform for the coordinating device 102 is interconnected to the network 104.

The database units 106, 108, 110 are typically formed by separate computer systems. However, it may also be possible that at least two database units are running on the same computer system. Each database unit 106, 108, 110 provides a particular functionality formed by a corresponding application. A first application 120 is associated to the first database unit 106, a second application 122 is associated to the second database unit 108 and a n-th application 124 is associated to the n-th database unit 110. It is acknowledged that a database unit may also include more than one application.

Furthermore, each database unit includes a database 130, 132, 134. The expression database should be understood as a complete implementation of a non-volatile storage system, comprising, in particular, a database management system and a respective storage device, such as a hard disk. It may also be possible, that one application accesses more than one database or that one database unit may include more than one database. However, since one object of the present invention is to establish prior point in time recovery targets, it has to be ensured that the method and the IT infrastructure according to the present invention consider every single database during the process of establishing prior point in time recovery targets.

When engaged in distributed transactions (including transactions with 2-phase commit) the application connects to multiple database systems at the same or different database units.

When discussing the method and the IT infrastructure according to the present invention in the following, it is stated that messages are sent to the databases 130, 132, 134. Depending on the actual setup, this might be performed by a communication via the network 104 and via the applications 120, 122, 124, or directly via the network 104 to the database management systems of the respective databases 130, 132, 134, or via some interface provided by the respective database units 106, 108, 110. In short, the coordinating device 102 is configured to be able to communicate with every one of the databases 130, 132 and 134.

A general-purpose computer hosting the coordinating device 102 may form the computer system 112. It should be noted that the coordinating device 102 could also run in one of the database units 106, 108, 110. A database information set 140 comprising the databases to be considered and a global log point information set 142 comprising the prior point in time recovery targets, also called "Global Log Points", are associated to the coordinating device 102. The information sets 140, 142 may be stored in a file, e.g., structured in XML (Extensible Markup Language), or in a database table.

The network could be formed by any wired or wireless communication link facilitating the communication between the coordinating device 102 and the databases 130, 132, 134. Typically, the network may be formed by TCP/IP (Transmission Control Protocol/Internet Protocol) network, such as the Internet. However, it could also be formed by an Intranet, a Virtual Private Network (VPN).

Figure 2A:
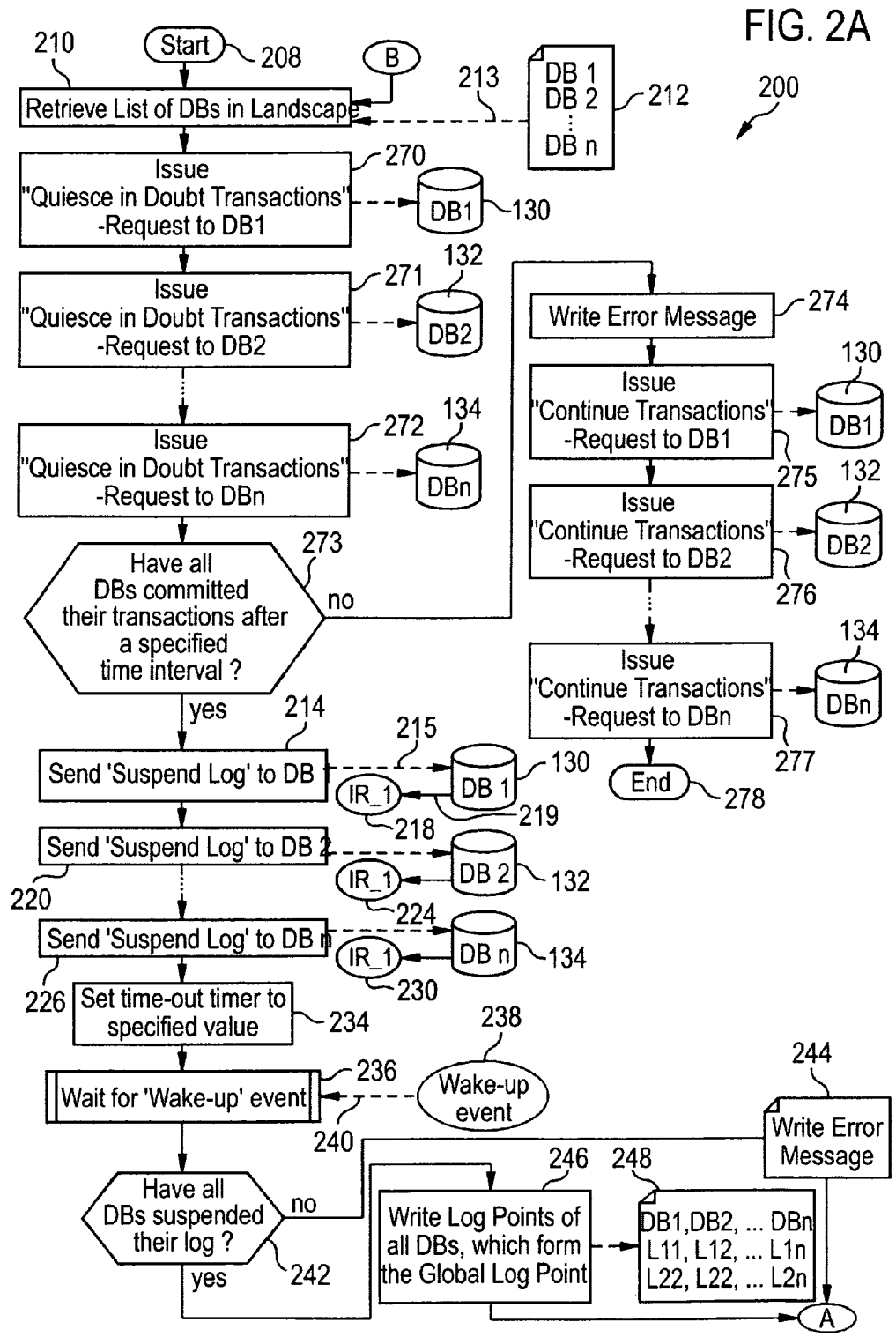
FIG. 2 shows a flow chart visualizing the sequence of the steps of the method for establishing a log point for automatic recovery of federated databases to a prior point in time according to an embodiment of the present invention.
Figure 2B:
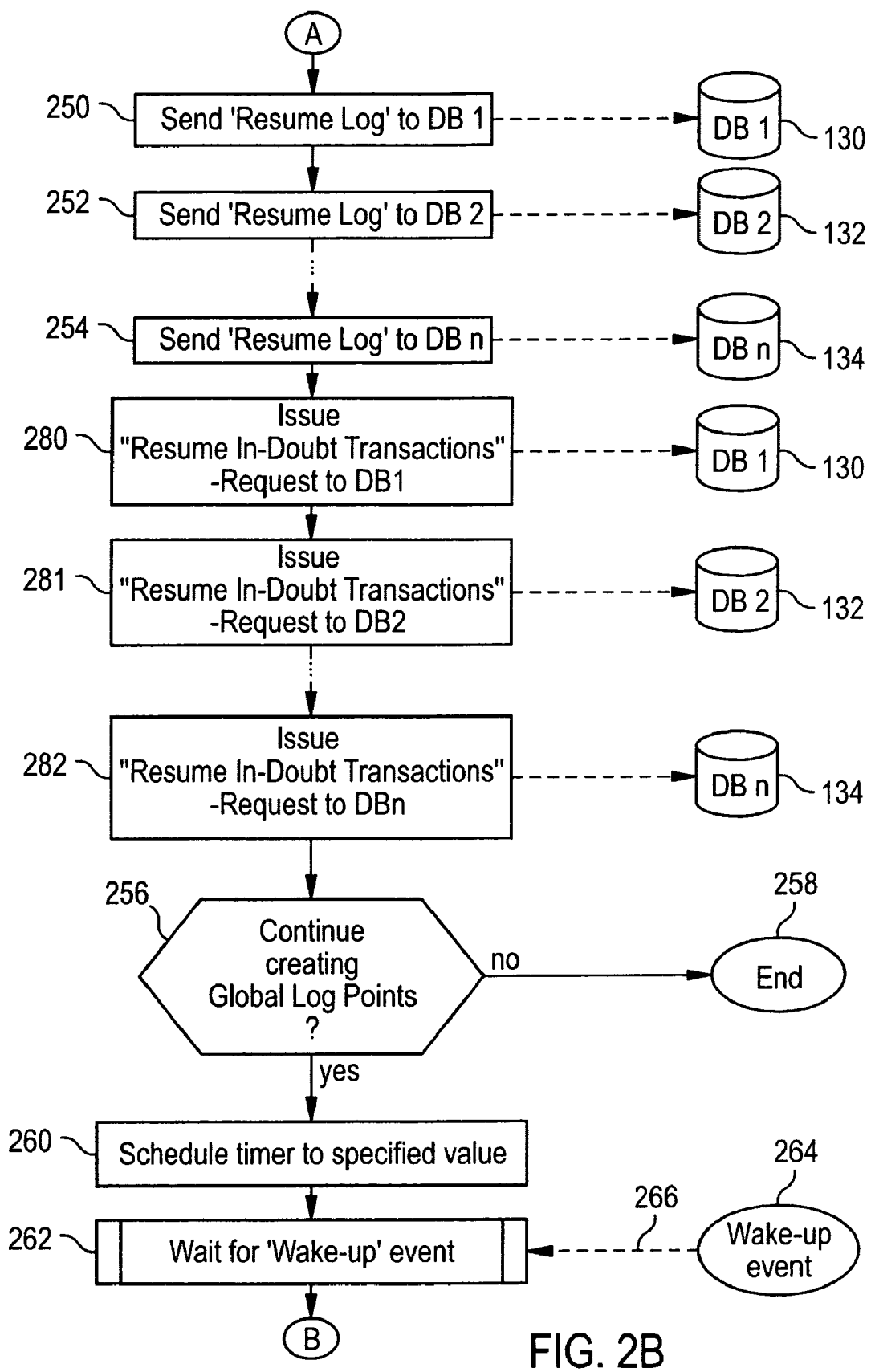

With reference to FIG. 2, there is depicted a detailed flow chart 200 visualizing the sequence of the steps of the method for establishing a log point for automatic recovery of federated databases to a prior point in time according to an embodiment of the present invention.

First of all, the coordinating device 102 retrieves a list of all databases 130, 132, 134 in the IT infrastructure 100 for which a global log point needs to be established. The list of all databases 130, 132, 134 may be stored in a database file 212 and may be read by the coordinating device 102 as illustrated by the data flow 213 running from the database file 212 to the execution block 210.

Subsequently, "quiesce in-doubt transactions"-requests are issued from the coordinating device 102 to the databases 130, 132, 134, as depicted in FIG. 2 by the execution steps 270, 271, 272.

When receiving such a "quiesce in-doubt transactions"-request, the respective databases 130, 132, 134 or the respective database units 106, 108, 110 enter a "suspending prepare to commit"-state, in which any transaction that is about to be engaged in a "two-phase commit"-process, i.e. for which the "prepare"-request was initiated after the "suspending prepare to commit"-request is suspended. Any transaction that is not engaged in a "two-phase commit"-process or that is engaged in a "two-phase commit"-process, but for which the "prepare"-request had been initiated before the "suspending prepare to commit"-request, is allowed to continue.

A "two-phase commit"-process has the characteristic that at least two database units are involved. Such a "two-phase commit"-process comprises the step of sending a "prepare to commit"-request from a first database unit to a second database unit and the further step of performing the "commit"-statement by a second database unit.

In the decision block 273 it is checked if all the database units 106, 108, 110 have completed their transactions. The waiting time is determined by the particular transaction that takes the longest time to commit. The transaction that takes the longest time to commit determines the time in which the respective database 130, 132, 134 stays in the "quiesce in-doubt transactions"-state.

If the waiting time exceeds a certain time interval, which is a user defined parameter, an error message is written in the execution block 274 and the transaction that caused the process to fail is reported for further diagnostics. Afterwards "continue transactions"-requests are issued from the coordinating device 102 to the databases 130, 132, 134, as shown with the execution blocks 275, 276, 277. The transactions in the database units 106, 108, 110 continue processing and the method according to this embodiment of the invention is stopped in this case (end block 278). In other words, the whole process of quiescing is aborted and all the transactions continue processing.

If the databases 130, 132, 134 commit their transactions within the specified time interval, the method is continued with the next execution blocks 214, 220, 226, wherein a respective command instructing the databases 130, 132, 134 to suspend writing their log files is sent to each database 130, 132, 134.

The log file of a database contains the information that is needed to recreate a consistent state of said database at a prior point in time. All modern databases, such as DB2, Sybase and Oracle provide such log files and the functionality of suspending the writing of such log files.

Note that the "quiesce in-doubt transactions"-requests can also be sent asynchronously. The same considerations apply as with the "suspend log" request. As said earlier, these requests can be combined into one i.e. "quiesce in-doubt" can be a part of "suspend log".

It is assumed that sending the suspend log command is done asynchronously as illustrated by the data flow 215, i.e., after sending the command. The coordinating device 102 may continue the processing without being forced to wait for a response, e.g., an acknowledge, from the respective databases 130, 132, 134. Instead of waiting for a response, an interrupt handler 218, 224, 230 that takes care of incoming responses from the databases 130, 132, 134 can be activated. The data flow 219 illustrates the database 130 calling the interrupt handler 218. Such an interrupt handler is known to a person skilled in the art and is therefore not explained any further.

Correspondingly, the execution block 220 illustrates sending the "suspend log"-command to the second database 132, which in return may call the interrupt handler 224 and the execution block 226 illustrates sending the "suspend log"-command to the n-th database 134, which in return may call the interrupt handler 230.

The partly dotted arrow between the execution blocks 220 and 226 illustrates that the "suspend log"-command may be sent to a plurality of databases. It is acknowledged that the steps of sending the "suspend log"-command to the databases may also be implemented synchronously or by using any kind of loops iterating through the list of all databases 130, 132, 134 in the IT infrastructure 100.

Then, in execution block 234 a time-out timer is set to a specified period of time. The time-out timer is not shown in FIG. 1, but may typically be provided by the computer system 112 that is hosting the coordinating device 102, such as an operating system, e.g., GNU/Linux, UNIX.

After the specified period of time has passed, the time-out timer generates a wake-up event 238 that is sent to the coordinating device 102 to initiate further processing. This mechanism ensures that the operations of the databases 130, 132, 134 are only delayed by a certain amount of time, which is normally set by the operator considering the real time constraints of the overall system forming the IT infrastructure 100. It should be noted that the step of setting the time-out timer may also be performed earlier in the procedure, e.g., before sending the first suspend log command to the databases 130, 132, 134, without departing from the idea of the present invention.

Subsequently, the execution of the procedure is halted, as depicted with the wait block 236. In this state the procedure waits for a wake-up event 238 to happen. This wake-up event 238 may either be initiated by the time-out timer or by one of the interrupt handlers 218, 224, 230 called by one of the databases 130, 132, 134. The occurrence of the wake-up event 238 is not synchronous and therefore visualized by a data flow 240.

At the latest when the time-out timer activates the wake-up event 238, the processing is continued. It may be earlier, namely, when all databases 130, 132, 134 acknowledged that they suspended their log. At this point, it gets determined whether or not all the databases 130, 132, 134 suspended their log, as shown with the decision block 242.

If no, an error message is written by the coordinating device 102 informing an administrator that a global log point could not be established (execution block 244). This might be the case if the communication to one database is delayed or temporarily interrupted. It is acknowledged that writing the error message may also be performed later in the procedure.

If yes, the log points returned by the databases 130, 132, 134, i.e., the entry in the respective log file indicating the fall back position of the particular databases 130, 132, 134, are stored (execution block 246) in a log point file 248, that can also be a table. Together with an indicator the respective log points of the particular databases 130, 132, 134 form the global log point.

Then, a "resume log"-command is sent to all databases 130, 132, 134 as illustrated by the execution blocks 250, 252, 254. It should be noted that the resume log commands might also be sent in parallel to all the participating database units 106, 108, 110, which is similar to the suspend log commands as described above. The only thing that matters is that at some point in time all the logs are suspended. The chronological sequence is not important.

After that, "resume in-doubt transactions"-requests are issued by the coordinating device 102 and sent to the database units 106, 108, 110, causing the respective databases to complete the "quiesce in-doubt"-processes, to exit the "quiesce in doubt transactions"-state and to resume the suspended transactions. These "resume in-doubt transactions"-requests are depicted with the executions steps 280, 281, 282 in FIG. 2.

Thereafter, it is determined whether or not it should be continued to create global log points, (decision block 256). If no, the procedure ends here (end block 258). If yes, a timer, such as a time-out timer, is programmed to schedule a wake-up event 264, as shown with execution block 260. Such a wake-up event 264 initiates establishing another global log point. Depending on the actual needs, global log points are established regularly, e.g., every hour or twice a day.

Subsequently, the execution of the procedure is halted (wait block 262). In this state the procedure waits for a wake-up event 264, initiated by the time-out timer. The occurrence of the wake-up event 264 is not synchronous and is therefore visualized by a data flow 266. After the wake-up the procedure is continued at the beginning, starting from execution block 210.

Figure 3:
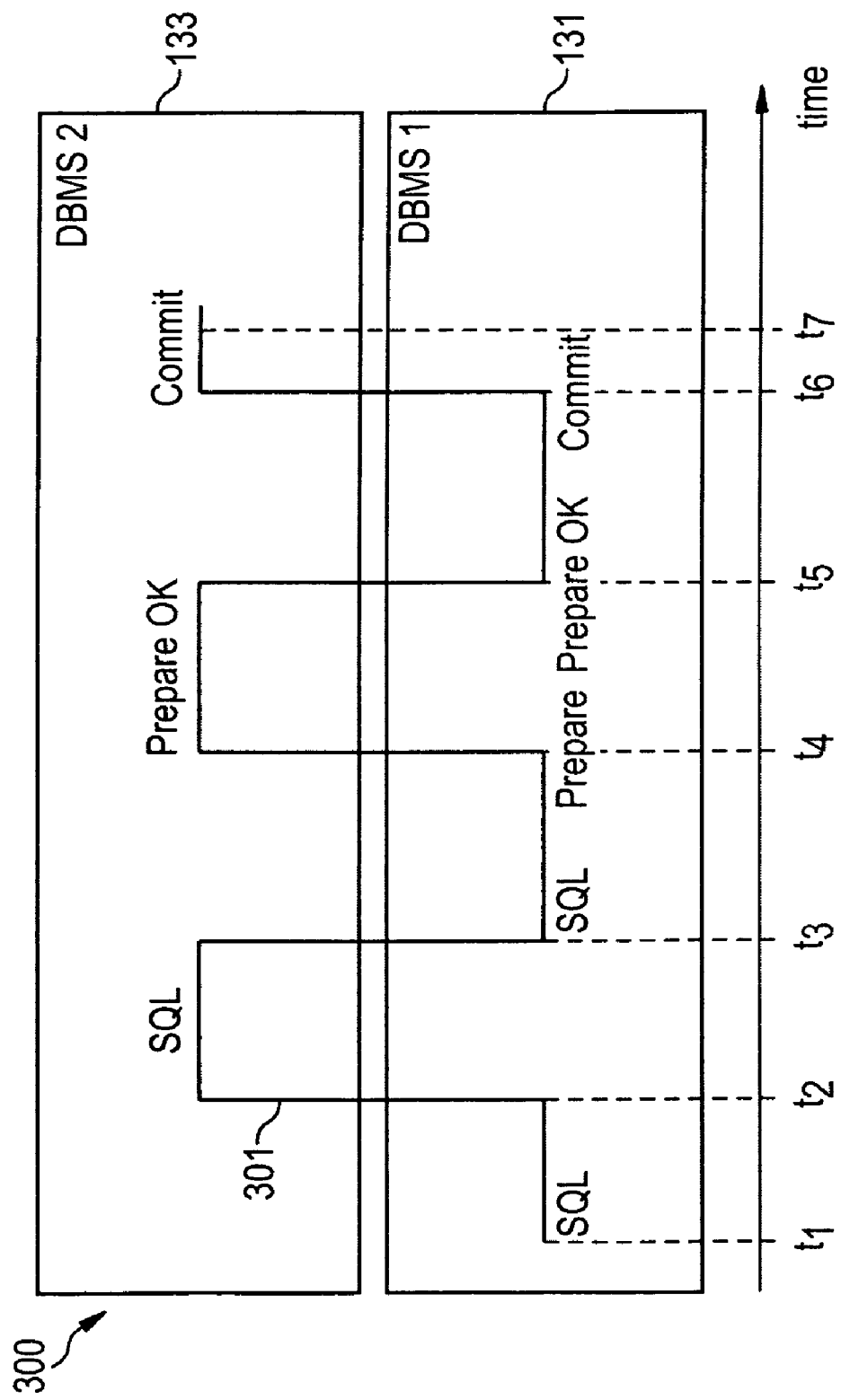
FIG. 3 shows a distributed transaction schematic visualizing a "two-phase commit"-process with two database management systems involved.

FIG. 3 shows a distributed transaction schematic visualizing a "two-phase commit"-process with two database management systems 131 and 133 involved.

There is a time bar extending from the left to the right hand side in the lower region of FIG. 3. On this time bar points of time $t_1$, $t_2$, $t_3$, $t_4$, $t_5$, $t_6$ and $t_7$ are drawn.

Above the time bar a first database management system 131 of the first database 130 and a second database management system 133 of the second database 132 are depicted as rectangles. A distributed transaction progression 301 showing the course of an exemplary transaction with the two database management systems 131 and 133 involved runs between the two database management systems 131 and 133.

At the beginning this distributed transaction executes SQL commands across the two database management systems 131 and 133. In the time intervals [$t_1$; $t_2$] and [$t_3$; $t_4$] SQL-commands are executed by the first database management system 131 and in the time interval [$t_2$; $t_3$] SQL-commands are executed by the second database management system 133.

The distributed transaction completes with a "two-phase commit"-process in the time interval [$t_4$; $t_7$]. This "two-phase commit"-process divides into a "prepare"/"prepare start" command issued by the first database management system 131 at $t_4$, into a "prepare ok"/"prepare end" command issued by the second database management system 133 at $t_5$ and into a "commit"/"commit start" command issued by the first database management system 131 at $t_6$.

When recovering the database management systems 131 and 133 to a recovery target being defined by any point in time on the time bar in FIG. 3 the following is to be considered.

Recovery to any point in time before $t_5$ would result in backing out the distributed transaction at both the first and the second database management system 131 and 133. Recovery to any point in time after $t_7$ would result in committing the transaction at both the first and the second database management system 131 and 133. Recovery to any point in time between $t_5$ and $t_7$ would result in an "in-doubt"-situation, as it is unclear if the "two-phase commit"-process is started, interrupted, back out or completed.

Therefore, a possible solution is to avoid the times between $t_5$ and $t_7$ for recovering. Unfortunately, this approach could result in not having an eligible recovery target for a relatively long time.

According to the invention, the log synchronization process must ensure that there are no "in-doubt"-transactions when establishing recovery targets. Therefore, the idea is to prevent transactions entering the phase after time $t_5$ during a "log write suspend"-request.

The transactions that are before that threshold or already beyond it are allowed to proceed. This so called "quiesce in doubt transactions"-process is completed when the log write is resumed. In order to optimize the subsequent recoveries the threshold can be moved to time $t_4$.

Namely, for the recovery performance it is advantageous to have more transactions that were committed at the recovery target time.

When a request for "quiesce in-doubt"-transactions is issued by the coordinating device 102, the respective database 130, 132, 134 enters a state with the characteristics as described above with respect to FIG. 2.

Figure 4:
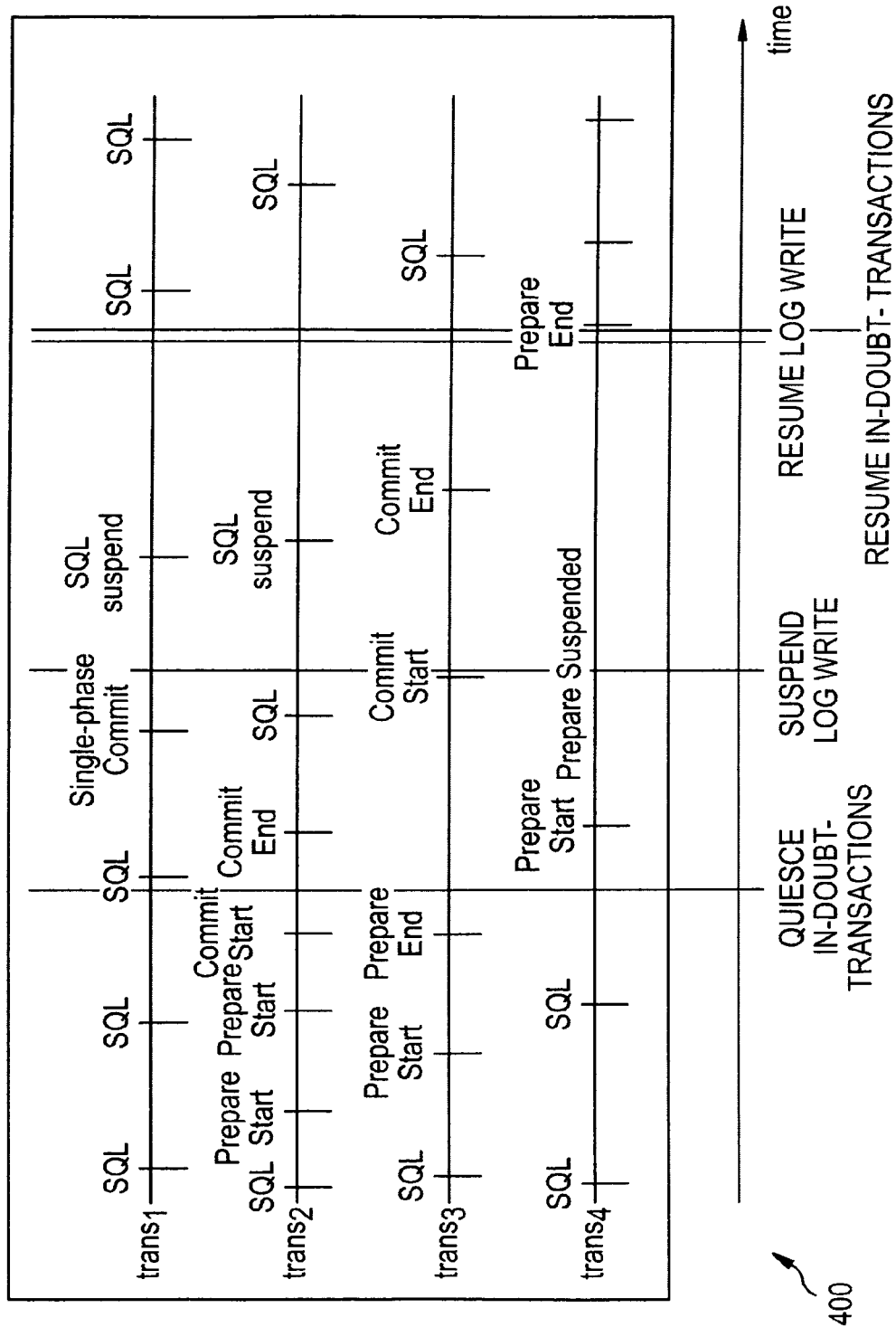
FIG. 4 shows a parallel transaction schematic visualizing the sequence in time of four parallel transactions.

FIG. 4 shows a parallel transaction schematic visualizing the sequence in time of four transactions.

There is a time bar extending from the left to the right hand side in the lower region of FIG. 4. On this time bar the points of time "quiesce "in-doubt"-transactions", "suspend log write", "resume log write" and "resume "in-doubt"-transactions" are drawn. These points of time correspond to the respective commands issued by the coordinating device 102.

Above the time bar four parallel transactions $trans_1$, $trans_2$, $trans_3$ and $trans_4$ are depicted, each of them comprising a respective sequence of commands in time.

The first parallel transaction $trans_1$ comprises three SQL-commands, a "single-phase commit"-process, a "SQL suspend"-command and two more SQL-commands.

The second parallel transaction $trans_2$ comprises a SQL-command, a "two-phase commit"-process with a "prepare start"-command, with a "prepare end"-command, with a "commit start"-command and with a "commit end"-command, as well as a SQL command, a "SQL suspend"-command and one more SQL-command.

The third parallel transaction $trans_3$ comprises a SQL-command, a "two-phase commit"-process with a "prepare start"-command, with a "prepare end"-command, with a "commit start"-command and with a "commit end"-command, as well as one more SQL-command.

The fourth parallel transaction $trans_4$ comprises two SQL-commands, a "prepare start"-command and a "prepare end"-command, of a "two-phase commit"-process.

Any of the parallel transactions $trans_1, \ldots, trans_4$ goes from the "in-doubt" into the "committed" state as soon as the "commit start"-log record of the "two-phase commit"-process is written. When the last "in-doubt"-transaction reaches that point, the "suspend log write"-request is to be initiated. As soon as the log write is resumed the. "quiesce "in-doubt"-process is completed and the suspended "in-doubt"-transactions are resumed.

The first parallel transaction $trans_1$ does not comprise a "two-phase commit"-process and is therefore not suspended by the coordinating device 102.

With the second parallel transaction $trans_2$ the "two-phase commit"-process has already reached the "commit start"-command when the "quiesce "in-doubt"-transactions"-command is triggered. With the third parallel transaction $trans_3$ the "two-phase commit"-process has already reached the "prepare end"-command when the "quiesce "in-doubt"-transactions"-command is triggered. Therefore the parallel transactions $trans_2$ and $trans_3$ are allowed to continue.

The fourth transaction $trans_4$ is the only transaction that is suspended, as the "quiesce "in-doubt"-transactions command is triggered by the coordinating device 102 before the "prepare start"-command of the fourth transaction $trans_4$.

The duration of the "quiesce "in-doubt"-transactions state is determined by the third transaction $trans_3$, as $trans_3$ takes the longest time to complete the "two-phase commit"-process, which ends with the "commit end"-command.

The "suspend log write"-command is executed in an environment where there are no "in-doubt"-transactions which guarantees problem free recovery to the corresponding point in time. Finally, the command "resume "in-doubt"-transactions is executed by the coordinating device 102, causing the fourth transaction $trans_4$ to resume the suspended "two-phase commit"-process.

A possible implementation of the invention is to encapsulate the "quiesce "in-doubt"-transactions command into the "suspend log write"-command, i.e. to perform the quiesce process implicitly as a part of the "suspend log write"-process. In that case the resumption of log writes coincides with resuming suspended "in-doubt"-transactions.

LIST OF REFERENCE NUMERALS

100 IT infrastructure
102 coordinating device
104 network
106 first database unit
108 second database unit
110 n-th database unit
111 further database units
112 computer system
120 first application
122 second application
124 n-th application
130 first database
131 first database management system
132 second database
133 second database management system
134 third database
140 database information set
142 global log points information set
200 flow chart
208 start blocks
210, 214, 220, 226, 234, 244, 246, 250, 252, 254, 260, 270-272, 274-277, 280-282 execution blocks
212 database file
213, 215, 219, 240, 266 data flows
218, 224, 230 interrupt handlers
236, 262 wait blocks
238, 266 wake-up events
242, 256, 273 decision blocks
248 log point file
258, 278 end blocks
300 distributed transaction schematic
301 distributed transaction progression
$t_1, \ldots, t_7$ points of time
400 parallel transaction schematic
$trans_1, \ldots, trans_4$ parallel transactions

The invention claimed is:

1. A method for establishing a log point for automatic recovery of related databases to a prior point in time, the method comprising:
   a) providing an information technology infrastructure including at least two database units, a network and a coordinating device, said database units and said coordinating device being interconnected by said network;
   b) performing transactions by at least two of the respective database units;
   c) sending suspending prepare to commit requests from said coordinating device to said database units and waiting for the transactions being in process to be completed;
   d) suspending log writes of all database units;
   e) recording the log points for each database unit, said log points forming a global log point;
   f) resuming log writes of all database units; and
   g) resuming all the suspended transactions, including any suspended two-phase commit transactions.

2. The method according to claim 1, wherein said coordinating device sends out continuing prepare to commit requests to said database units as well as an error message, if the waiting time in step c) exceeds a specified time threshold.

3. The method according to claim 2, wherein the log writes of all database units are suspended in step d), when a commit start log record is written for the last two-phase commit process being in process.

4. The method according to claim 3, wherein the following step is carried out after step a):
   a') retrieving or generating a list of all database units contained in the information technology infrastructure by the coordinating device.

5. The method according to claim 4, wherein at least one of said database units includes an application unit and a database, said database having a database management system and a storage device.

6. The method according to claim 5, wherein each of said database units is provided on a separate computer system, said computer systems being interconnected by said network.

7. The method according to claim 6, wherein said information technology infrastructure provided in step a) also includes a timer, said timer being activated before step c) and wherein the method continues with step f) only, if said timer signals a wake-up event.

8. The method according to claim 7, wherein the following step is carried out after step e):
   e') generating a wake-up event by the timer, if all database units have suspended their log writes.

9. The method according to claim 7, wherein the following step is carried out after step e):
   e") waiting for a wake-up event to occur.

10. The method according to claim 8, wherein the steps c) and d) are performed concurrently.

11. The method according to claim 10, wherein the following steps are carried out after step g):
    h) selecting a global log point by said coordinating device; and
    i) initiating to recover each database management system to their log points by said coordinating device.

12. An information technology infrastructure for establishing a log point for automatic recovery of related databases to a prior point in time, said information technology infrastructure, comprising:

at least two database units;

a network; and a coordinating device for coordinating suspending log writes for all database units, for recording the log points for each database unit, for forming a global log point, and for resuming log writes of all database units.

13. The information technology infrastructure according to claim 12, wherein at least one of said database units includes an application unit and a database, said database having a database management system and a storage device.

14. The information technology infrastructure according to claim 13, wherein each of said database units is provided on a separate computer system, said computer systems being interconnected by said network.

15. A coordinating device for coordinating suspending log writes for database units and for recording at least one log point for each database unit, for forming a global log point and for resuming log writes of all database units, the database units and the coordinating device forming an information technology infrastructure for establishing a log point for automated recovery of related databases to a prior point in time in a network.

16. The coordinating device according to claim 15 adapted to cooperate with database units, and further comprising:

an application unit and a database within said database unit, said database having a database management system and a storage device; and wherein each of said database units is provided on a separate computer system, said computer systems being interconnected by said network.

17. A computer program product for causing an information technology infrastructure having at least one database unit and coordinating device to perform a method for establishing a log point for automatic recovery of related databases to a prior point in time, said computer program product comprising a computer program stored in a memory, wherein the computer program, when executed on a computer, causes the computing device to:

a) provide an information technology infrastructure including at least two database units, a network and a coordinating device, said database units and said coordinating device being interconnected by said network;

b) perform transactions by at least two of the respective database units;

c) send suspending prepare to commit requests from said coordinating device to said database units and waiting for the transactions being in process to be completed;

d) suspend log writes of all database units;

e) record the log points for each database units, said log points forming a global log point;

e) resume log writes of all database units; and f) resume all the suspended transactions, including any suspended two-phase commit transactions.

* * * * *